United States Patent [19]

Haller

[11] Patent Number: 5,326,044
[45] Date of Patent: Jul. 5, 1994

[54] TAPE ALIGNMENT DEVICE FOR TAPE CARTRIDGE

[76] Inventor: John L. Haller, 7249 Carrizo Dr., La Jolla, Calif. 92037

[21] Appl. No.: 848,524

[22] Filed: Mar. 9, 1992

[51] Int. Cl.⁵ .............................................. G11B 23/04
[52] U.S. Cl. .................................. 242/346.1; 242/342
[58] Field of Search ............... 242/199, 200, 76, 192; 360/132; 226/196

[56] References Cited

U.S. PATENT DOCUMENTS

| | | | |
|---|---|---|---|
| 4,006,493 | 2/1977 | Gerry | 242/192 X |
| 4,642,721 | 2/1987 | Georgens et al. | 242/192 X |
| 4,754,938 | 7/1988 | Satoh | 242/199 |
| 4,757,958 | 7/1988 | Elliott | 242/199 |
| 4,793,570 | 12/1988 | Gelardi | 242/199 |
| 4,819,889 | 4/1989 | Satoh | 242/199 |
| 5,104,058 | 4/1992 | Eggebeen | 242/199 |
| 5,153,799 | 10/1992 | Tanaka | 360/132 |

*Primary Examiner*—Daniel P. Stodola
*Assistant Examiner*—Eileen Dunn
*Attorney, Agent, or Firm*—Brown, Martin, Haller & McClain

[57] ABSTRACT

A tape alignment device for a tape cartridge having a tape head opening in its front wall is a one-piece guide member having spaced guide surfaces for guiding tape in a predetermined path between the guide surfaces. The guide surfaces are connected together in a fixed orientation relative to one another by a rigid connecting piece. A securing mechanism such as one or more mounting posts is provided on the guide member for mounting the guide member in a tape cartridge with the guide surfaces positioned one on each side of the tape head opening and in a fixed orientation relative to the base of the cartridge.

16 Claims, 2 Drawing Sheets

TAPE ALIGNMENT DEVICE FOR TAPE CARTRIDGE

BACKGROUND OF THE INVENTION

The present invention relates generally to magnetic tape cartridges and more specifically belt-driven magnetic tape cartridges in which a magnetic tape is stored and guided along a tape path across a tape head opening, and is particularly concerned with an alignment device for such cartridges to align the tape as it passes across the tape head opening.

Belt-driven magnetic tape cartridges of the type described in U.S. Pat. No. 3,692,255 (Yon Behren) typically include various guide pins which are orthogonally mounted in a base plate. Typically, guide pins are mounted on each side of the tape head opening to align the tape as it passes across the tape head. Any misalignment of the tape or deflection from its path may cause signal distortions. This is a particular problem in current belt-driven magnetic data tapes which typically have a very high recording density and track density, and are driven at high speed across read and write heads. Even a slight vertical deflection of the tape as it travels through the tape head opening may cause problems. Thus, belt-driven magnetic tape cartridges have guide pins on each side of the tape head opening which receives the read or write head as it is pressed against the tape. Extreme tolerances are required in mounting these pins on each side of the tape head opening to ensure that they are orthogonal to the base and at a fixed height relative to one another. If either or both of the guide pins on each side of the tape head opening are tilted from the vertical or orthogonal orientation relative to the base plate, the tape will be correspondingly tilted from a horizontal path, causing alignment problems between the tape and the read/write head with corresponding signal distortions or loss. Thus, it is important that these guide pins are seated precisely in a fixed orientation to each other and relative to the base plate. The precision of this fixed orientation has been difficult to achieve in practice.

SUMMARY OF THE INVENTION

It is an object of the present invention to provide a new and improved tape alignment device for a tape cartridge and in particular a belt-driven tape cartridge.

According to the present invention, a tape alignment device for guiding magnetic tape across the tape head opening of a belt-driven tape cartridge is provided, which comprises a tape guiding member of unitary construction for guiding tape across a tape head opening in a belt-driven tape cartridge, the member having spaced first and second guides each having an at least partially curved guide surface having an upper and a lower end, the guides defining respective first and second vertical guide axes, each of the guides having at least one guide shoulder at the upper or lower end projecting transversely to the respective vertical guide axis for locating an upper or lower edge of the tape as it travels across the guide surface, and a connecting piece connecting the first and second guide surfaces rigidly together in a predetermined fixed orientation relative to one another. A securing mechanism is provided for securing the guiding member to the base or cover of a tape cartridge so that the guide surfaces are positioned on each side of the tape head opening.

In a preferred embodiment of the invention, the connecting piece connects the guide surfaces together so that their axes extend parallel to one another and the guide axes extend perpendicular to the base of the cartridge when mounted in the cartridge. In one embodiment, at least one mounting pin project from the guiding member for engagement in corresponding opening provided in the cartridge base or cover, the pin being secured in the respective opening to hold the guide member in the correct orientation in the cartridge.

With this arrangement, the problems of one of the guide pins on one side of a tape head opening being not fixed in a precise orientation relative to the pin on the other side of the opening are avoided, since the two guide surfaces form part of a one-piece guide member. Thus, rather than securing two pins separately to a base plate or cover, with each pin being separately aligned orthogonally to the base plate and at separately-installed heights from the surface of the base plate, the guides are rigidly secured together in a fixed relative orientation to one another as part of a one-piece guide member which itself is secured in the cartridge. Thus, only one member needs to be aligned in the correct orientation relative to the base plate, rather than two, and the risk of misalignment is substantially reduced. This arrangement also allows for consistent positioning from cartridge to cartridge during manufacture, since individual pins do not have to be aligned separately but are already held in a predetermined fixed orientation relative to one another.

Preferably, each guide surface is arcuate or at least partially cylindrical and has projecting upper and lower shoulders at its upper and lower ends for forming a horizontal guide for the upper and lower edges, respectively, of a portion of tape guided across the guide surface. The connecting piece secures each shoulder in a precise position relative to the shoulder on the other guide surface. In one embodiment, each upper shoulder may be aligned with the upper shoulder of the other guide, with the lower shoulders correspondingly aligned, although in alternative embodiments some vertical offset may be built in to allow for biassing of the tape. This arrangement produces a consistently reproducible tape path between the guide surfaces from tape cartridge to tape cartridge, minimizing distortions.

BRIEF DESCRIPTION OF THE DRAWINGS

The present invention will be better understood from the following detailed description of some preferred embodiments of the invention, taken in conjunction with the accompanying drawings, in which like reference numerals refer to like parts, and in which.

DESCRIPTION OF THE PREFERRED EMBODIMENTS

Figure 3:
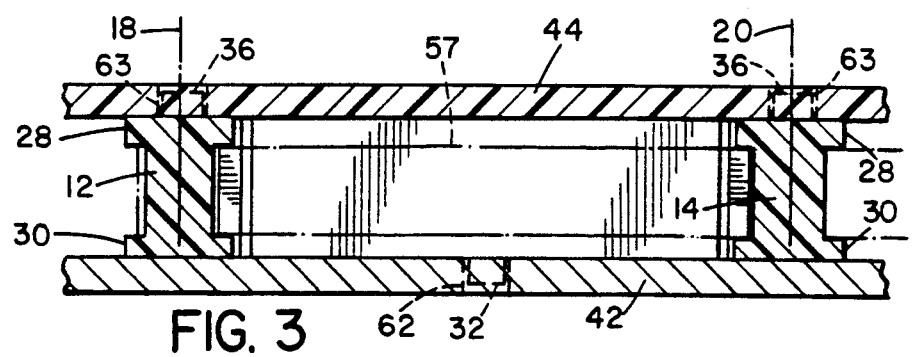
FIG. 3 is an enlarged sectional view taken on line 3—3 of FIG. 2.
Figure 1:
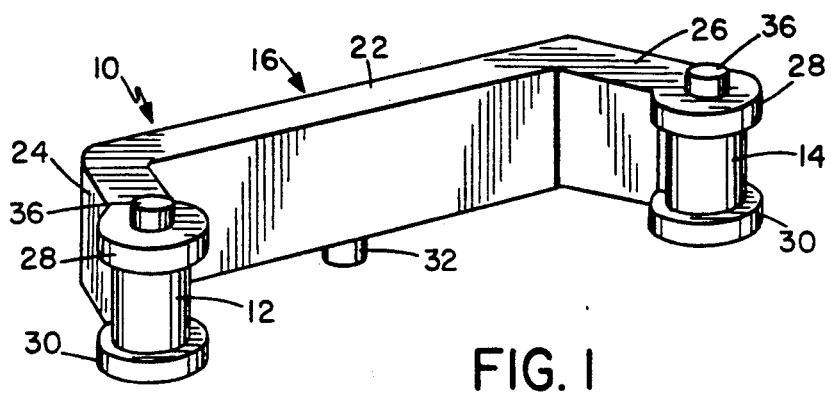
FIG. 1 is a perspective view of the tape alignment device according to a first embodiment of the invention.
Figure 7:
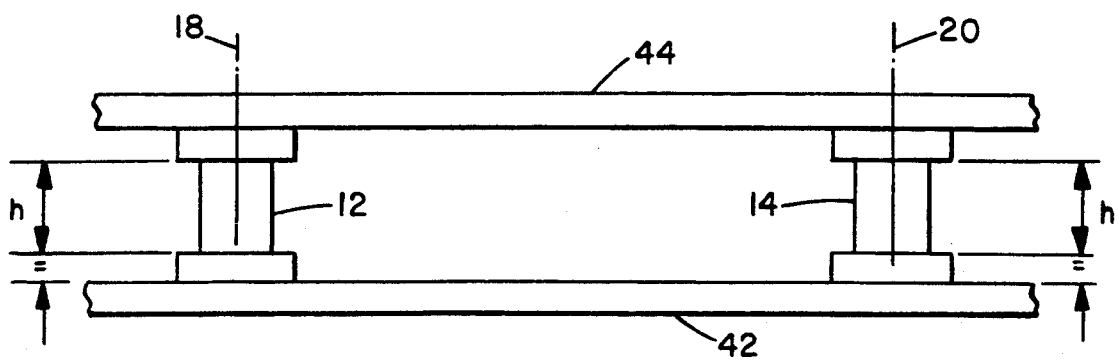
FIG. 7 illustrates the configuration of the tape alignment.

FIG. 1 illustrates a tape guide or alignment member 10 according to a first embodiment of the present invention. As illustrated in FIG. 1, the guide member 10 is of unitary or one-piece construction, and may be fabricated out of any suitable material such as metal, plastic or ceramics, for example by molding, grinding, milling or the like. Member 10 has spaced first and second tape guides and respective first and second partially-cylindrical tape guide surfaces 12, 14 and a connecting piece or portion 16 extending between the surfaces 12 and 14 to rigidly secure them together with their guide axes 18, 20 extending in a fixed, typically parallel, orientation to one another. As best illustrated in FIGS. 3 and 7, the guide axes 18 and 20 comprise the longitudinal axes of the tape guide surfaces 12 and 14, and are vertical and parallel to one another. Preferably, connecting piece 16 forms a back wall 22 and angled side arms 24, 26, with the guide surfaces 12, 14 being formed as rounded enlargements at the outer ends of the side arms 24, 26.

Each of the guide surfaces 12, 14 has enlarged upper and lower rims or annular shoulders 28, 30 at their upper and lower ends, respectively, to form upper and lower guides for locating the upper and lower edges of a tape 57 against displacement as it is guided between the rounded surface of the guide surfaces 12 and 14, as best illustrated in FIG. 3. The distance between each upper and lower shoulder 28, 30 will be generally equal to the width of the tape 57. Although each guide surface 12, 14 has upper and lower shoulders 28, 30 in the preferred embodiment, in an alternative arrangement one of the surfaces may have an upper shoulder only while the other surface would have a lower shoulder only, with the vertical offset between the shoulders being slightly less than the tape height to achieve desired positioning of the tape as it travels between the surfaces. Although the guide member 10 of FIG. 1 is of open construction in the illustrated embodiment, it may have upper and lower walls extending between the side arms and across the rear wall in alternative embodiments.

A suitable securing and alignment mechanism is provided for mounting the guide member 10 in a tape cartridge or housing. In the illustrated embodiment, a mounting pin 32 projects downwardly from a mid-point on the back wall 22, while a pair of optional alignment pins 36 project upwardly from the upper ends of the respective guide surface structures 12 and 14.

Figure 2:
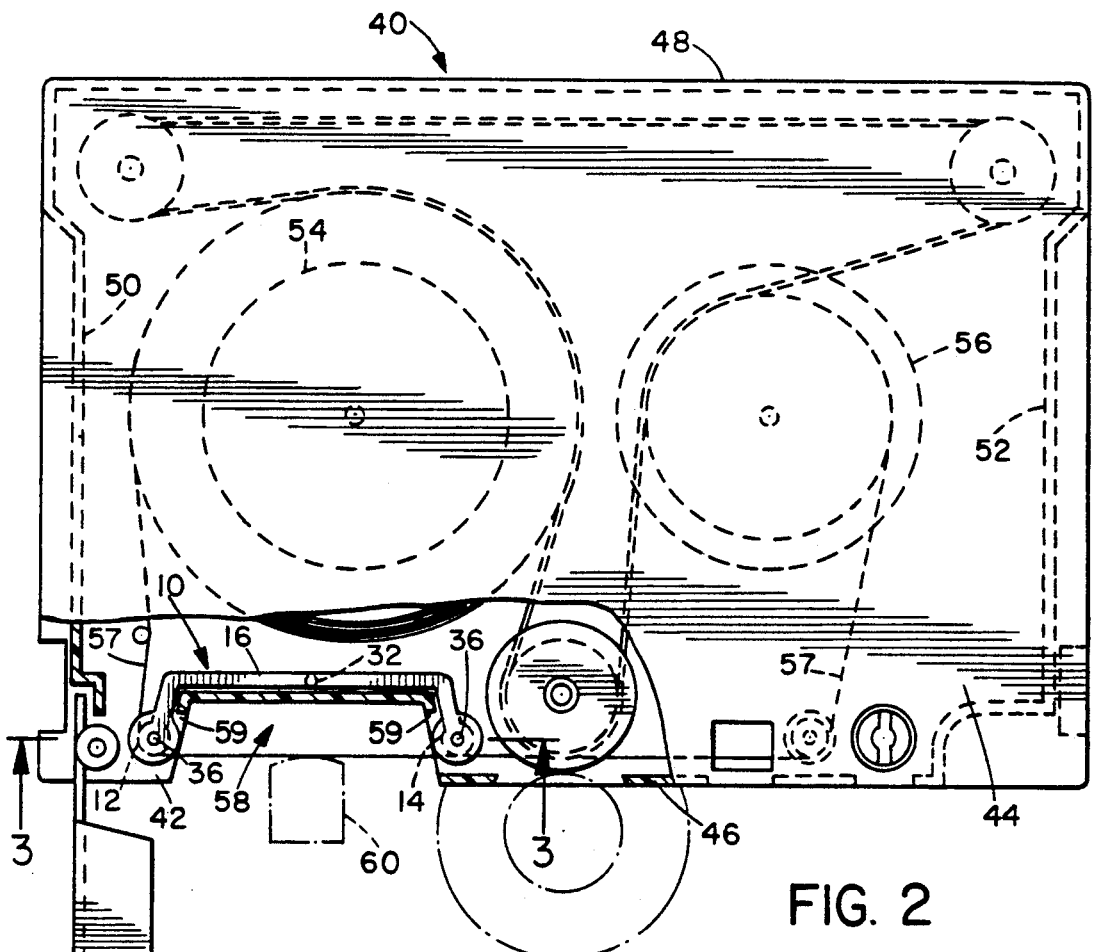
FIG. 2 is a top plan view of a typical belt-driven magnetic tape cassette, partially cut away to show the installation of the tape alignment device.

The guide member 10 is designed to be mounted in a standard belt-driven magnetic tape cartridge housing 40 as illustrated in FIGS. 2 and 3. Housing 40 includes a flat base member 42 and a cover member 44 secured to the base member to define a generally rectangular enclosure. Opposite front and rear walls 46, 48, and opposite side walls 50, 52, which may be formed integrally with the base or cover, complete the enclosure. A pair of tape spools 54, 56 are rotatably supported on the base plate for rotation about spaced, parallel axes, and magnetic recording tape 57 is wound around the tape spools and extends around a predetermined travel path between the spools around various tape guides and across a tape head opening or recess 58 in the front wall of the cartridge where a tape head 60 projects into contact with the tape. Recess 58 is formed in the front wall with aligned openings 59 on each side of the recess through which the tape extends to travel across the tape head opening.

As illustrated in FIG. 2, the housing 40 includes a conventional belt drive comprising an inside drive belt 130 extends around belt drive roller 132 and corner rollers 134 to drive the outside, $\frac{1}{4}$-inch magnetic data tape 57. The front wall of the housing 40 has an opening 136 through which a drive roller or capstan 138 projects to engage drive roller 132 and drive the belt 130 in a conventional manner. The belt 130 contacts the tape wound on both spools and frictionally drives the tape.

As best illustrated in FIG. 2, the guide member 10 is secured in the housing so that the guide surfaces 12 and 14 are positioned on opposite sides of the tape head recess 58 adjacent openings 59 so as to form guides for the tape in the tape path on each side of the opening. The shape of guide member 10 is designed to generally follow the shape of the tape head opening or recess 58.

The guide member 10 may be secured either to the cover or to the base, but in the preferred embodiment illustrated it is secured to the base via mounting pin 32 which extends into a corresponding mounting hole 62 provided in the base member 42, as best illustrated in FIG. 3, and alignment pins 36 which project into aligned holes 63 in the cover member 44. Preferably, the mounting pin 32 is a press or close frictional fit in hole 62, and pins 36 are a press fit into holes 63, in order to ensure proper orthogonal mounting of member 10 relative to base member 42. This is designed to allow proper positioning of the guide member while preventing rotation out of the position illustrated in FIG. 2. Alternatively, the pins may be keyed and/or secured in place via welding or adhesive if necessary. Instead of alignment pins 36 projecting up into the cover, they may alternatively project down into aligned openings in the base plate or may be replaced with a sharp edge or rim projecting upwardly or downwardly from the guide member 10 for biting into the base member 42 and/or cover member 44 ensure proper orientation of the guide member 10. In an alternative embodiment securing and/or aligning the guide member 10 to the tape cartridge housing 40 may be achieved by projections from the base member 42 and/or the cover member 44 which are received into corresponding recesses in the upper and/or lower surfaces of the guide member 10.

With this arrangement, the opposite guide surfaces 12 and 14 of the one-piece guide member 10 will be rigidly held parallel to one another and perpendicular to the base plate 42, as best illustrated in FIGS. 3 and 7. The height h of each of the guide surfaces 12 and 14 between the upper and lower shoulders 28 and 30 is substantially equal to the tape height, and in the illustrated embodiment each upper shoulder will be aligned with the upper shoulder on the other guide surface, while each lower shoulder will be precisely aligned with the lower shoulder on the other guide surface, as illustrated in FIG. 7, avoiding any vertical displacement of the tape as it travels across the opening. The shoulders are also aligned parallel to the base plate 42 when the member 10 is mounted in the housing as illustrated in FIGS. 3 and 7, so that a tape guided between guide surfaces 12 and 14 will be spaced a predetermined distance above the base plate and oriented parallel to the base plate as it travels across the entire width of the tape head opening, ensuring proper alignment of each tape track with the tape head. The aligned upper and lower guide shoulders 28 and 30 resist any vertical displacement of the tape as it travels across opening. Thus, the risk of distortion will be minimized. With this arrangement, rather than separately aligning two separate guide pins where there is a cumulative risk of some misalignment of the height, and parallel orientation between the two separate guide pins, the guide surfaces 12 and 14 of the one-piece guide member 10 are always in parallel orientation to each other and all that is necessary is for single the guide member itself to be installed in the correct perpendicular orientation.

Although the guide surfaces are parallel to one another in the illustrated embodiment, it may be desirable in some alternative embodiments to have the guide surfaces at a fixed angular orientation relative to one another, for example if some small predetermined degree of biassing of the tape is needed. Additionally, the upper and lower guide shoulders 28, 30 of the respective guide surfaces 12, 14 need not necessarily be in alignment. In some cases, some fixed offset between the respective shoulders may be desired for tape biassing, and this can also be built in to the integral, one-piece guide member 10 if necessary. In every case, the connecting piece 16 secures the guide surfaces 12, 14 together in a fixed relative orientation so that a fixed and reproducible tape path between the guides. The tape path is therefore precisely reproducible in each tape cartridge manufactured using this one-piece guide member.

The one-piece guide member of this invention allows tape stability across the read or write head to be maintained more easily and with more accuracy. The guide surfaces on each side of the tape head opening or recess are part of a single, rigid unit, so that their relative positions are always maintained and they do not have to be aligned relative to one another on installation in a tape housing, since the alignment is achieved through the construction of the one-piece guide member.

Figure 4:
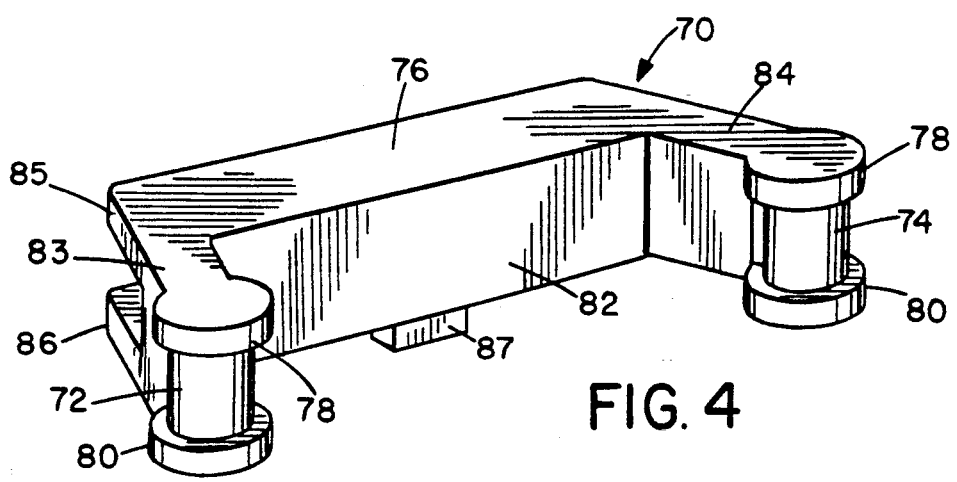
FIG. 4 is a perspective view of an alternative configuration of the tape alignment device.

FIG. 4 illustrates an alternative guide member 70 in which guides 72, 74 which are similar to the guide surfaces 12, 14 in the first embodiment are rigidly secured together by connecting piece 76 extending between the guides to hold them rigidly together with their vertical axes parallel and their upper and lower ends in horizontal alignment. As in the first embodiment, each guide has an upper and lower guide shoulder 78 and 80 which are equivalent to shoulders 28 and 30 in the first embodiment. Mounting pins 87 project downwardly from the rear wall 82 for engagement in corresponding openings in the tape housing base plate, as in the previous embodiment. As shown, mounting pin 87 may be keyed in any convenient manner to resist rotation of the guide member 10.

While the preferred embodiment of the guide member would include a single mounting pin securely attached to the base, more than one mounting pin and/or mounting recess may be provided for attachment to the base and/or the cover. Additionally, the guide member may include one or more optional alignment pins and/or recesses for engagement with the base and/or cover. The mounting pins and/or recesses are characterized by a more secure engagement with the cover and/or base while the alignment pins are characterized by a less secure engagement with the base and/or cover.

In this embodiment, the connecting piece 76 includes a rear wall 82 and side arms 83, 84 as in the first embodiment, but the rear wall 82 has rearwardly projecting upper and lower flanges 85, 86 for added strength and rigidity. As in the first embodiment, the connecting piece holds the two guide ends with their axes parallel to one another or in any other desired fixed relative orientation. The upper and lower guide shoulders are also held in precise relative alignment for guiding upper and lower edges of the tape between the guides.

Figure 5:
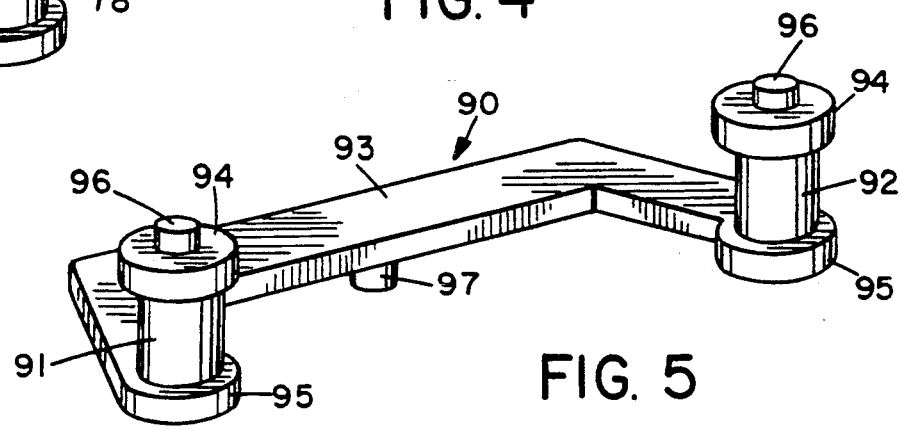
FIG. 5 is a perspective view of a further configuration.

Another alternative guide member 90 is illustrated in FIG. 5. Guide member 90 has spaced guide pins 91, 92 which are rigidly secured together with their vertical axes parallel to one another by means of connecting piece 93 which comprises a flat, angular base plate following the same basic shape as the connecting pieces in the previous embodiments. As in the previous embodiments, each guide pin has an upper and a lower shoulder 94, 95 for guiding the upper and lower edges of a tape. However, in this embodiment, the connecting piece 93 forms an extension of the two lower shoulders 95. As in the previous embodiments, the guide pins have mounting or alignment pins 96 projecting upwardly from their upper ends for engagement in corresponding openings in a tape housing cover, while a central mounting pin 97 projects downwardly from a central region of connecting piece 93 for engagement in a corresponding opening on the base plate of the tape housing. In an alternative embodiment, the construction of the guide member 90 may be inverted whereby the connecting piece may be across the top connecting the two upper shoulders 94.

This guide member will be mounted in a tape housing so that the guide pins are positioned on opposite sides of the tape head opening or recess, as in the first embodiment, and the connecting piece 93 will ensure that the guide pins are oriented parallel to one another and perpendicular to the base plate, and that the upper and lower shoulders are in alignment and parallel to the base plate, or in any other desired fixed relative orientation. The connecting piece in this version uses less material and thus the guide member will be less expensive than the first two embodiments.

Figure 6:
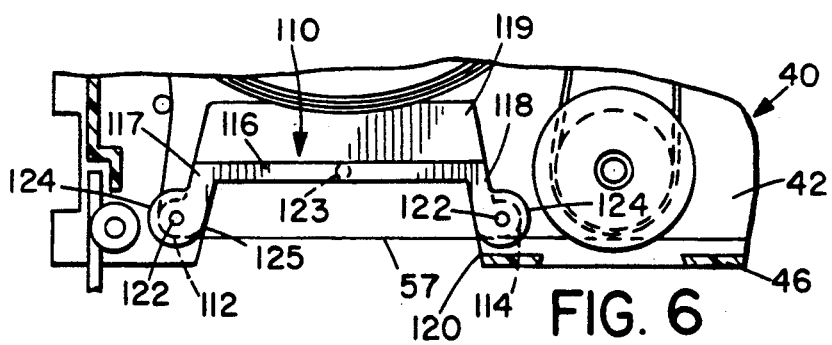
FIG. 6 is a view similar to a portion of FIG. 2, showing an alternative tape alignment device incorporated directly into the cassette structure.

FIG. 6 illustrates another alternative guide member 110 mounted in a tape housing 40. Guide member 110 is similar to the guide member 70 illustrated in FIG. 4, but with the upper flange 85 eliminated. Guide member 110 has spaced guides 112, 114 which are equivalent to guides 72, 74 in FIG. 4, and a connecting piece extending between the guides comprises a rear wall 116 and side walls 117, 118. A lower flange 119 similar to flange 86 in FIG. 4 projects rearwardly from rear wall 116. The spacing between the spool of tape 57 on that side of the housing and the base wall 42 will be sufficient to accommodate flange 119, as indicated in FIG. 6. In this alternative, instead of providing a recess in the front wall of the housing itself, the front wall 46 of the tape housing 40 is flat and has an appropriate opening 120 cut out at an appropriate location for receiving a read/write tape head. The guide member 110 is mounted in the housing via upper and lower mounting pins 122, 123 in a similar manner to the previous embodiments. However, in this version, the rear wall and side walls of the guide member actually form the rear wall and side walls of the tape head recess, as illustrated. Each guide or guide pin 112, 114 has upper and lower guide shoulders as in the previous embodiments, with only the upper shoulders 124 being visible in FIG. 6. The shoulders are cut away at their inner faces 125 to form a linear continuation of the side walls 117, 118, so that the shoulders do not project into the tape head recess.

In all the embodiments described above, a guide member for guiding tape has two spaced guide surfaces which are rigidly held together in a unitary construction so that they are automatically oriented in fixed relationship, generally parallel, to one another and with their guide shoulders in fixed alignment. As mentioned above, the same principle may be used in alternative guide members where the guides are oriented in other nonparallel relative orientations and with the shoulders offset. The guide member can be mounted easily in the correct orientation in a tape housing in a one step operation, without the need to orient two separate guides relative to one another as well as relative to the housing base plate. This arrangement will minimize or reduce the risk of tape offset causing distortions as the tape travels across the tape head opening, and considerably simplifies tape housing construction.

The preferred application of the tape alignment device described herein is directed to belt-driven magnetic tape cartridges but the structure is appropriate for any magnetic tape cartridge application.

Although a preferred embodiment of the present invention has been described above by way of example only, it will be understood by those skilled in the field that modifications may be made to the disclosed embodiment without departing from the scope of the present invention, which is defined by the appended claims.

I claim:

1. A tape alignment device, comprising:
 a guide member consisting of a single piece of material having opposite, outer ends, the outer ends comprising spaced first and second tape guides, and a rigid connecting portion extending between the tape guides to secure them rigidly together in predetermined relative positions and orientation;
 each tape guide being formed integrally in one piece with said connecting portion and having an at least partially curved, fixed tape guide surface for guiding tape around the tape guide, the guide surface having an upper and a lower end, the tape guide surfaces defining first and second vertical guide axes, respectively, and each tape guide having at least one guide shoulder projecting transverse to the guide axis at the upper or lower end of the respective guide surface;
 the connecting portion comprising a straight, elongate rear wall having opposite first and second ends, and straight, first and second side arms projecting outwardly at an obtuse angle from the respective first and second ends of said rear wall and having outer ends offset forwardly from said rear wall, each tape guide comprising an at least partially cylindrical enlargement formed integrally at the outer end of the respective side arm; and
 a securing mechanism for mounting the guide member in a tape cartridge housing with the tape guides positioned on opposite sides of a tape head opening in the housing to guide tape across the tape head opening.

2. The device as claimed in claim 1, wherein the connecting portion secures the tape guides together with their guide axes parallel to one another and the securing means comprises means for securing said guide member in the housing with the tape guide axes perpendicular to a base wall of the housing.

3. The device as claimed in claim 1, wherein each guide has upper and lower annular projecting rims at the upper and lower ends, respectively, of the tape guiding surface for guiding the upper and lower edges of a tape extending across the cylindrical surface of the guide.

4. The device as claimed in claim 1, wherein said securing mechanism comprises a first mounting post projecting downwardly from said connecting portion for engagement in a corresponding mounting opening in a tape housing base member.

5. The device as claimed in claim 1, wherein said securing mechanism includes at least one pin projecting upwardly from said guide member for engagement in a corresponding mounting opening in a tape housing cover.

6. The device as claimed in claim 5, wherein said securing mechanism includes a pair of upwardly projecting pins, each pin projecting upwardly from the upper end of a respective one of said tape guides.

7. The device as claimed in claim 1, wherein each guide comprises a part-cylindrical enlargement at the outer end of the respective side arm.

8. The device as claimed in claim 1, including upper and lower parallel flanges projecting rearwardly from the upper and lower ends of said rear wall.

9. The device as claimed in claim 1, wherein the connecting portion comprises only a flat connecting bar extending between the lower ends of said guides.

10. A belt-driven tape cartridge housing for housing a data tape and belt drive assembly, comprising:
 a rectangular enclosure comprising a cover, a base spaced from the cover, and peripheral side, front and rear walls, the front wall having a tape head recess extending partially across the front wall and offset to one side of the center of the front wall, the recess comprising means for allowing a tape head to contact a magnetic tape travelling across said recess, the front wall having first and second aligned openings on opposite sides of said recess;
 a pair of tape spools supported for rotation on spaced parallel axes within said enclosure for holding the tape;
 guide means for defining a tape path in said enclosure extending between said tape spools and extending through said first opening across the tape head recess in the front wall of the enclosure and back through said second opening into said enclosure;
 belt drive means for driving the tape between said spools and across said tape head recess, the drive means comprising a belt drive roller and a pair of spaced corner rollers defining a belt path extending across the tape held on both spools, a drive belt extending around said belt drive roller and corner rollers along said belt path to contact the tape on both spools, and a belt driver for rotating said drive roller to move the belt along said path in order to frictionally drive the tape between said spools; and
 said guide means including a unitary guide member for guiding tape between said first and second openings across said tape head recess, said guide member consisting of a single piece of material and having spaced guides positioned on opposite sides of said tape head recess at said first and second openings, respectively, and a connecting portion extending around the periphery of said recess between said guides and securing them rigidly together in a fixed relative orientation, the connecting portion being shaped to match the shape of said recess between said first and second openings, each guide being formed integrally in one piece with said connecting portion and having a guide surface defining a vertical guide axis, and at least one guide shoulder extending transverse to the guide axis at an upper or lower end of the guide surface for locating the upper or lower edge of a tape guided across said guide surface; and the guide member being secured to at least one of the base and cover.

11. The housing as claimed in claim 10, wherein the base has at least one opening adjacent said tape head recess and the guide member has a projecting post which is a close frictional fit in said base opening.

12. The housing as claimed in claim 11, wherein said post is located at a central position on said connecting piece.

13. The housing as claimed in claim 10, wherein said connecting portion has a rear wall and side arms at opposite ends of said rear wall each projecting at a predetermined angle to said rear wall, and said guide member is secured in said housing at a position offset inwardly from said front wall, said guide member rear wall and side arms forming a rear wall and side walls, respectively, of said recess, said rear wall of said connecting portion comprising an elongate, straight wall.

14. The housing as claimed in claim 10, wherein each guide has at least one arcuate guide surface.

15. The housing as claimed in claim 14, wherein each guide is at least partially cylindrical and has annular projecting shoulders at its upper and lower ends.

16. The housing as claimed in claim 10, wherein the guides are oriented with their guide axes parallel to one another and perpendicular to the base and with each guide shoulder at a predetermined vertical position relative to the guide shoulders on the other guide.

* * * * *